US012608613B2

(12) United States Patent
Shibata

(10) Patent No.: US 12,608,613 B2
(45) Date of Patent: Apr. 21, 2026

(54) PARAMETER OPTIMIZATION DEVICE, PARAMETER OPTIMIZATION METHOD, AND PARAMETER OPTIMIZATION PROGRAM

(71) Applicant: NEC Corporation, Tokyo (JP)

(72) Inventor: Seiya Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 970 days.

(21) Appl. No.: 17/781,539

(22) PCT Filed: Dec. 6, 2019

(86) PCT No.: PCT/JP2019/047947
§ 371 (c)(1),
(2) Date: Jun. 1, 2022

(87) PCT Pub. No.: WO2021/111633
PCT Pub. Date: Jun. 10, 2021

(65) Prior Publication Data
US 2023/0004810 A1     Jan. 5, 2023

(51) Int. Cl.
*G06N 3/082*     (2023.01)
*G06N 3/0464*     (2023.01)

(52) U.S. Cl.
CPC .......... *G06N 3/082* (2013.01); *G06N 3/0464* (2023.01)

(58) Field of Classification Search
CPC .............................. G06N 3/0464; G06N 3/082
See application file for complete search history.

(56) References Cited

U.S. PATENT DOCUMENTS

2018/0225993 A1     8/2018   Buras et al.

FOREIGN PATENT DOCUMENTS

| JP | 6555411 | B2 | 8/2019 |
| JP | 2019-175140 | A | 10/2019 |
| JP | 2019-537139 | A | 12/2019 |

OTHER PUBLICATIONS

Sercu, Tom, and Vaibhava Goel. "Dense prediction on sequences with time-dilated convolutions for speech recognition." arXiv preprint arXiv:1611.09288 (2016). (Year: 2016).*
International Search Report for PCT Application No. PCT/JP2019/047947, mailed on Feb. 4, 2020.
Tianyang Wang et al., "Dilated Deep Residual Network for Image Denoising", arXiv [Online], Sep. 27, 2017 [retrieval date Jan. 22, 2020], <URL:https://arxiv.org/pdf/1708.05473.pdf>, in particular, chapter III.
JP Office Action for JP Application No. 2021-562433, mailed on May 16, 2023 with English Translation.

* cited by examiner

*Primary Examiner* — Eric Nilsson
(74) *Attorney, Agent, or Firm* — Sughrue Mion, PLLC

(57) ABSTRACT

A parameter optimization device 800 optimizes input CNN structure information and outputs optimized CNN structure information, and includes stride and dilation use layer detection means 811 for extracting stride and dilation parameter information for each convolution layer from the input CNN structure information, and stride and dilation use position modification means 812 for changing the stride and dilation parameter information of the convolution layer.

11 Claims, 10 Drawing Sheets

FIG. 5

| Layer | 1 | 2 | 3 | 4 | 5 | 6 |
|---|---|---|---|---|---|---|
| Dilation | 1 | 1 | 2̸ | 2 | 2 | 2̸ |
| Stride | 1 | 1 | 2 | 1 | 1 | 2 |

| Layer | 1 | 2 | 3 | 4 | 5 | 6 |
|---|---|---|---|---|---|---|
| Dilation | 1 | 1 | 1 | 2 | 2̸ | 1 |
| Stride | 1 | 2 | 1 | 1 | 2 | 1 |

| Layer | 1 | 2 | 3 | 4 | 5 | 6 |
|---|---|---|---|---|---|---|
| Dilation | 1 | 1 | 1 | 2̸ | 1 | 1 |
| Stride | 1 | 2 | 1 | 2 | 1 | 1 |

| Layer | 1 | 2 | 3 | 4 | 5 | 6 |
|---|---|---|---|---|---|---|
| Dilation | 1 | 1 | 1 | 1 | 1 | 1 |
| Stride | 1 | 2 | 2 | 1 | 1 | 1 |

START

INPUT CNN STRUCTURE — S401

DETECT LAYERS USING STRIDE AND DILATION — S402

CHANGE STRIDE AND DILATION USE POSITION — S403

S404

REMAINING LAYER OF gcd (Stride, Dilation) > 1?    YES

NO

OUTPUT CNN STRUCTURE — S405

END

| Layer | 1 | 2 | 3 |
|---|---|---|---|
| Dilation | 1 | 1 | |
| Stride | 1 | 1 | 2 |

| Layer | 1 | 2 | 3 |
|---|---|---|---|
| Dilation | 1 | 1 | 2 |
| Stride | 1 | 2 | 1 |

| Layer | 1 | 2 | 3 |
|---|---|---|---|
| Dilation | 1 | 1 | 2 |
| Stride | 1 | 1 | 4 |

| Layer | 1 | 2 | 3 |
|---|---|---|---|
| Dilation | 1 | 1 | 1 |
| Stride | 1 | 2 | 2 |

| Layer | 1 | 2 | 3 |
|---|---|---|---|
| Dilation | 1 | 1 | 2 |
| Stride | 1 | 1 | 4 |

| Layer | 1 | 2 | 3 |
|---|---|---|---|
| Dilation | 1 | 1 | 1 |
| Stride | 1 | 4 | 1 |

800

PARAMETER OPTIMIZATION DEVICE

STRIDE AND
DILATION USE LAYER
DETECTION MEANS — 811

STRIDE AND
DILATION USE POSITION
MODIFICATION MEANS — 812

4 × 4 Image    4 × 4

5 × 5 Image    3 × 3

D=1                    D=2                    D=3

PARAMETER OPTIMIZATION DEVICE, PARAMETER OPTIMIZATION METHOD, AND PARAMETER OPTIMIZATION PROGRAM

This application is a National Stage Entry of PCT/JP2019/047947 filed on Dec. 6, 2019, the contents of all of which are incorporated herein by reference, in their entirety.

TECHNICAL FIELD

This invention relates to a parameter optimization device, a parameter optimization method, and a parameter optimization program for optimizing parameters used during a convolutional neural network operation.

BACKGROUND ART

Technological development related to image recognition, etc., using a multilayer neural network is actively underway. Such technology is also called deep learning. In particular, a convolutional neural network is widely used in the field of image recognition and other technologies. The convolutional neural network includes a convolutional layer, a pooling layer, and a fully connected layer, as described below. For example, in the convolutional layer, the process of convolving kernels into the entire image is performed.

A set of features that are convolved into the image is obtained by the process of convolving kernels into the entire image (a process of applying a filter to the image). The set of features is also called a feature map. The feature map is obtained by applying an activation function to the convolved values. For example, in the field of image recognition, ReLU (Rectified Linear Unit) is used as an activation function.

As mentioned above, in the convolution layer, the process of convolving kernels (weights and filters) into the image (input image) is performed. At that time, a number of processes are performed to multiply each pixel of the image with each weight of the kernel.

Parameters for representing the convolution layer include a kernel size, an input width, an input height, the number of input channels, an output width, an output height, the number of output channels, padding, a stride, a dilation, etc.

The kernel size is a parameter defining the number of pixels handled by a filter in the convolution process. For example, when the kernel size is 3, a 3×3 pixel kernel with a height of 3 pixels×a width of 3 pixels is used for convolution.

An input width W, an input height H, the number of input channels $C_i$, an output width W', an output height H', and the number of output channels $C_o$ are values for defining the data size of the image, respectively. A pair of an input width W and an input height H is the input size, and a pair of an output width W' and an output height H' is the output size.

The plane of input data defined by the input size is a screen or an input screen. The input data consists of screens of the number of input channels. The number of output channels $C_o$ among the output data size is often given explicitly as a parameter. Each of the output width W' and output height H' may be defined by a combination each of the input width W and input height H, and the padding and stride.

The padding is a parameter defined for allowing convolution processing even when the convolution processing range defined by the kernel size exceeds the input width W and input height H. For example, in a convolution process centered on a pixel position at the edge of the screen, off-screen pixels are always referenced. Therefore, for example, the padding size is set to 1 and the value of off-screen pixels is set to a specific value (such as zero). In this way, the convolution process centered on a pixel position at the edge of the screen becomes to be allowed (refer to outside of the thick solid frames in the left sides of FIGS. 16A and 16B).

For example, if the size of the padding is 0, there are no pixels corresponding to the elements of the kernel, in which case the convolution process cannot be centered on the pixel position at the edge of the screen. Therefore, the output width W' or output height H' is reduced from the input width W or input height H. In other words, the output size becomes smaller than the input size. In order to keep the output width W' and output height H' the same as the input width W and input height H, the size of the padding must be set appropriately.

The stride is a parameter defining a movement interval of a kernel in the convolution process.

FIGS. 16A and 16B are explanatory diagrams for explaining a stride. FIG. 16A shows a result of convolving an input image of the input size of 4×4 using a kernel whose size is 3. FIG. 16B shows a result of convolving an input image of the input size of 5×5 using a kernel whose size is 3. Note that the padding size is set to 1 and zero padding is applied around the input image.

In the case where the stride value is 1 (FIG. 16A), when the convolution operation is performed, pixels surrounded by dotted lines are referred to, and then pixels, which are off by one pixel, surrounded by broken lines are referred to. Accordingly, all pixels of the screen are used as the center position. If the padding size is properly set, the output size will match the input size. In the case where the stride value is 2 (FIG. 16B), pixels surrounded by dotted lines are referred to, and then pixels, which are off by two pixels, surrounded by broken lines are referred to. The output width W' is ½ of the input width W, and the output height H' is ½ of the input height H ½. In other words, the output size is ¼ of the input size.

The dilation is a parameter defining an interval of pixels referred in the convolution process.

FIG. 17 is an explanatory diagram for explaining a dilation. Pixels (shaded area) referred to when D=1 are shown in the left side of FIG. 17. The pixels referred to when D=2 are shown in the center of FIG. 17. The pixels referred to when D=3 in the right side of FIG. 17. Note that D indicates a dilation value. In all cases, the kernel size is 3.

When the dilation value is 1 (the left side of FIG. 17), the pixel at the center position and the pixels one pixel next to the pixel at the center position, i.e., the surrounding 8 pixels are referred to.

When the dilation value is 2 (the center of FIG. 17), two neighboring pixels from the pixel at the center position are referred to. In other words, there is an interval between the referred pixels.

By using the dilation, the convolution processing range can be expanded without increasing the amount of operations in the convolution process. For example, when the kernel size is 3 and the dilation value is 2, the rough range of regions referred to in the convolution process is equivalent to that in the convolution process using the kernel whose size is 5 and the dilation whose value is 1. When the dilation value is 3 (the right side of FIG. 17), the rough range of regions referred to in the convolution process is equivalent to that in the convolution process using the kernel whose size is 7 and the dilation whose value is 1.

Patent literature 1 describes an information processing device that changes parameters of a neural network. However, that information processing device does not handle a dilation as a parameter.

CITATION LIST

Patent Literature

PTL 1: Japanese Patent No. 6555411

SUMMARY OF INVENTION

Technical Problem

As mentioned above, the deep learning, especially the convolutional layer operation, requires a huge number of multiplications. The huge number of multiplications requires large-scale hardware or a processor with powerful operational capability. When using slow devices, a way to get the devices to work at high speed, by reducing the load of the operation, is required.

It is an object of the present invention to provide a parameter optimization device, a parameter optimization method, and a parameter optimization program, for optimizing parameters used during convolutional neural network operations, that can reduce the number of multiplications in a convolutional layer when the convolutional neural network is operated.

Solution to Problem

The parameter optimization device that optimizes input CNN structure information and outputs optimized CNN structure information stride and dilation use layer detection means for extracting stride and dilation parameter information for each convolution layer from the input CNN structure information, and stride and dilation use position modification means for changing the stride and dilation parameter information of the convolution layer.

The parameter optimization method for optimizing input CNN structure information and outputting optimized CNN structure information according to the present invention includes extracting stride and dilation parameter information for each convolution layer from the input CNN structure information, and changing the stride and dilation parameter information of the convolution layer.

The parameter optimization program for optimizing input CNN structure information and outputting optimized CNN structure information according to the present invention causes a computer to execute a process of extracting stride and dilation parameter information for each convolution layer from the input CNN structure information, and a process of changing the stride and dilation parameter information of the convolution layer.

Advantageous Effects of Invention

According to the present invention, the number of multiplications in a convolutional layer can be reduced during convolutional neural network operations.

BRIEF DESCRIPTION OF DRAWINGS

FIG. 5 It depicts an explanatory diagram showing an example of an optimization method of parameter values in the first example embodiment.

DESCRIPTION OF EMBODIMENTS

First, an overview of example embodiments will be given. The connecting line between blocks in each figure indicates a bidirectional or unidirectional line. The unidirectional arrows are a straightforward indication of the direction of signal (data) flow, and do not exclude bidirectionality.

Example Embodiment 1

Figure 1:
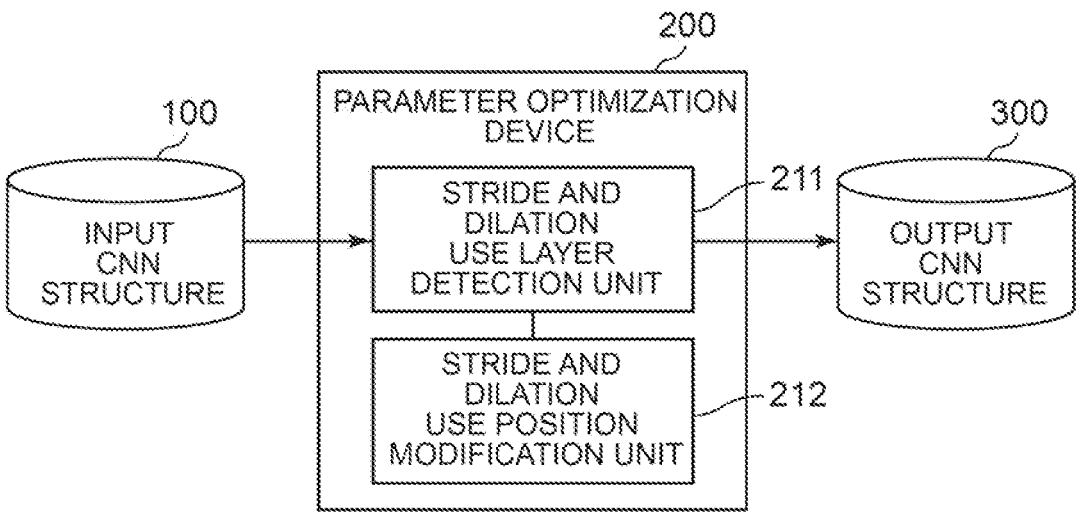
FIG. 1 It depicts a block diagram showing an example of a parameter optimization device of the first example embodiment.
Figure 2:
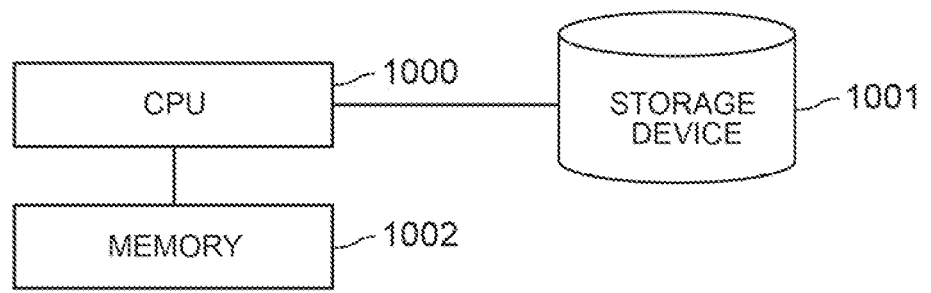
FIG. 2 It depicts a block diagram of an example of a computer including a CPU.

Hereinafter, the first example embodiment of the present invention is explained with reference to the drawings. FIG. 1 is a block diagram of a parameter optimization device 200 of the first example embodiment. The parameter optimization device 200 of the first example embodiment includes two processing blocks described in FIG. 1. That is, the parameter optimization device 200 includes a stride and dilation use layer detection unit 211 and a stride and dilation use position modification unit 212.

The stride and dilation use layer detection unit 211 extracts parameter information of stride and dilation from input CNN structure information 100. For example, the stride and dilation use layer detection unit 211 obtains each parameter value from the parameter definition file that exists in the CNN structure information 100.

The stride and dilation use position modification unit 212 optimizes a stride value and a dilation value by modifying them based on the parameter information of stride and dilation extracted by the stride and dilation use layer detection unit 211 according to a logic described below. The stride and dilation use position modification unit 212 outputs the optimized CNN structure information 300 to the CNN execution environment connected to the parameter optimization device 200.

Each component in the parameter optimization device 200 shown in FIG. 1 may be configured with a single piece of hardware, but can also be configured with a single piece of software. Each component may be configured with a plurality of pieces of hardware or a plurality of pieces of software. Further, part of the components may be configured with hardware and the other part with software.

When each component in the parameter optimization device 200 is realized by a computer having a processor such as a central processing unit (CPU), a memory, etc., the parameter optimization device 200 can be realized a computer having a CPU shown in FIG. 1. The CPU 1000 executes a process (parameter optimization process) in accordance with a program stored in a storage device 1001 to realize the functions of the stride and dilation use layer detection unit 211 and the stride and dilation use position modification unit 212 in the parameter optimization device 200 shown in FIG. 1.

The storage device 1001 is, for example, a non-transitory computer readable media. The non-transitory computer readable medium is one of various types of tangible storage media. Specific examples of the non-transitory computer readable media include a magnetic storage medium (for example, flexible disk, magnetic tape, hard disk), a magneto-optical storage medium (for example, magneto-optical disc), a compact disc-read only memory (CD-ROM), a compact disc-recordable (CD-R), a compact disc-rewritable (CD-R/W), and a semiconductor memory (for example, a mask ROM, a programmable ROM (PROM), an erasable PROM (EPROM), a flash ROM).

The program may be stored in various types of transitory computer readable media. The transitory computer readable medium is supplied with the program through, for example, a wired or wireless communication channel, or, through electric signals, optical signals, or electromagnetic waves.

The memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002.

Hereinafter, an optimization method in the first example embodiment will be explained with reference to the drawings.

The stride and dilation use layer detection unit 211 analyzes the layer structure and the parameters that each layer has, based on the input CNN structure information 100.

In the case where multiple convolution layers are used, when the processing of a layer, that is not a convolution layer, used between two convolution layers does not use multiple pixels (neurons) and does not change a position relationship of the pixels, the stride and dilation use layer detection unit 211 ignores the presence of the layer. In other words, the stride and dilation use layer detection unit 211 determines that the two convolution layers are adjacent. For example, an activation function such as ReLU, and BatchNormalization and DropOut used during inference are per-pixel, i.e. per-neuron multiply accumulation process. Accordingly, multiple pixels are not used and the positional relationship between pixels is not changed. Therefore, in this optimization, layers that are not convolution layers can be ignored. On the other hand, for example, the linear layer (fully connected layer) cannot be ignored because a multiply accumulation process using values of all pixels is performed for the layer, ignoring a positional relationship between pixels. In addition, when a pooling layer is present, the pooling layer cannot be ignored.

The optimization of this example embodiment is applied to multiple adjacent convolution layers obtained by the above method.

Figure 3:
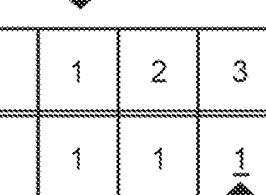
FIG. 3 It depicts an explanatory diagram showing an example of an optimization method of parameter values in the first example embodiment.
Figure 4:
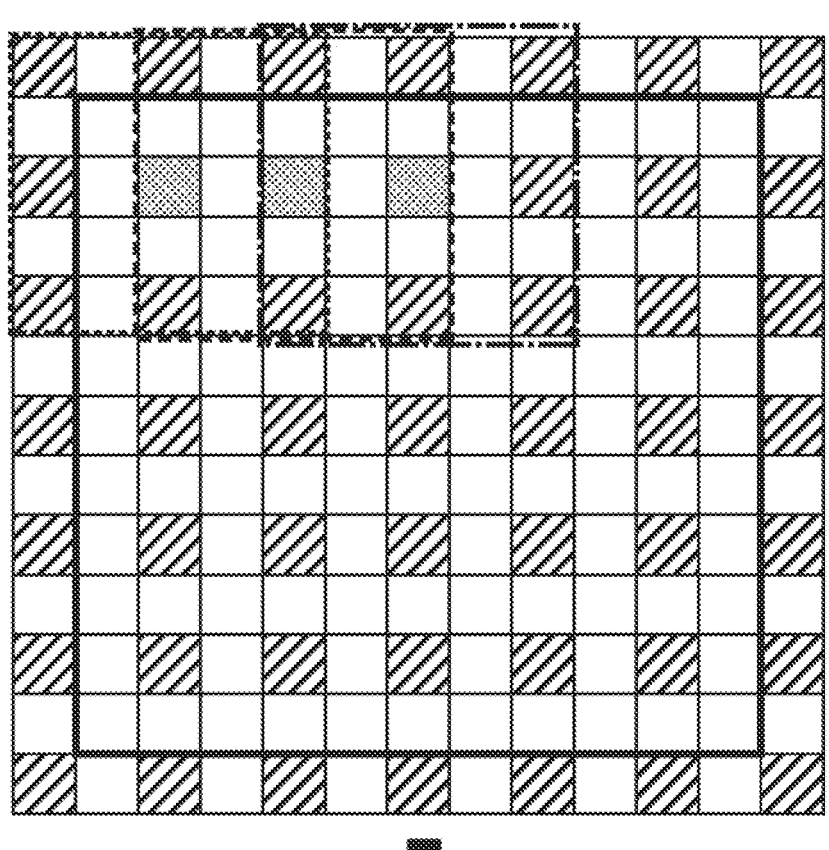
FIG. 4 It depicts an explanatory diagram showing an example of an input image.
Figure 4:
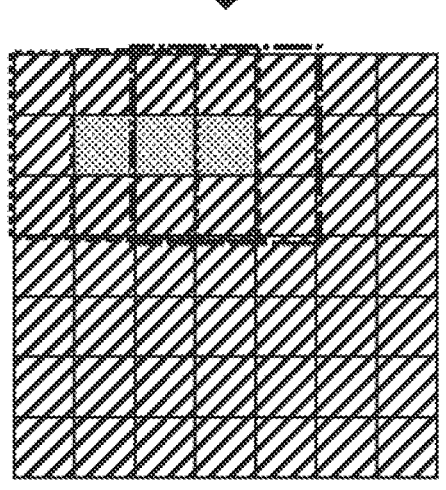

The stride and dilation use layer detection unit 211 brings parameter information of the adjacent convolution layers into three-dimensional information of the layer number (Layer), the dilation (Dilation), and the stride (Stride) as shown in FIG. 3. FIG. 4 an explanatory diagram showing an input image (bold rectangle) with an input size of 11×11. The area enclosed by a dotted box shows a range that is firstly convolved with one kernel. The area enclosed by a dashed box shows a range that is secondly convolved with the kernel. The area enclosed by a chain line box shows a range that is the next convolved with the kernel. The rectangles with halftone dots show pixels of interest for illustrative purposes. The shaded rectangles (shaded areas) show pixels referred to in the convolution process. The size of the padding is 1. Layer (layer number) may also mean the layer itself.

In the upper example shown in FIG. 3, the dilation value is 2 and the stride value is 2 in Layer 3. In such a case, as shown in FIG. 4, the only pixels referred to in the convolution process are the shaded pixels. White areas (pixels other than shaded rectangles or rectangles with halftone dots) are present but never used.

In other words, the white rectangles of input of the Layer 3, which accounts for ¾ of the total, are not referred to in the convolution process and is not needed. Therefore, ¾ of output of Layer 2 is unnecessary. The convolution process for these unnecessary pixels is useless.

In such a network, the stride and dilation use position modification unit 212 changes the stride value in Layer 2 from 1 to 2. It can be changed so that only the necessary areas in Layer 3 is computed, as shown in the bottom row in FIG. 4. In addition, since the pixels to be referred to in the Layer 3 convolution process will be adjacent to each other, the dilation value can be 1. In FIG. 3, the numbers of the areas modified by the stride and dilation use position modification unit 212 are underlined.

In summary, the stride and dilation use position modification unit 212 changes the stride value in Layer 2 from 1 to 2, and the dilation value in Layer 3 from 2 to 1, and change the stride value from 2 to 1. By this, the layer with a dilation value of 2 is no longer needed and the stride can be moved to the previous layer, while the output of Layer 3 is maintained. Consequently, the stride value of Layer 2 becomes to be 2, and the calculation amount in each of Layer 2 and Layer 3 is reduced to ¼.

As shown in FIG. 5, this optimization process operates to propagate changes to the previous layer as much as possible. In the example illustrated at the upper row in FIG. 5, first, at Layers 3 and 6, the stride can be moved to the previous layer as described above. As a result of the movement of the stride from Layer 6 to Layer 5, such a situation arises as both the dilation value and the stride value are 2. Therefore, the optimization can be applied again (refer to the second row in FIG. 5). After that, the same optimization can then be applied to Layer 4 (the second row from the bottom in FIG. 5). Finally, the stride value of 2 moves to Layer 3 (refer to the lower row in FIG. 5).

In other words, the optimization in this example embodiment can be applied from a deeper layer to a shallower layer in a phased manner. As shown in the flowchart shown in FIG. 6, the optimization can be applied repeatedly until there are no more layers where both the stride value and dilation are 2 throughout all layers.

Figures 6, 7:
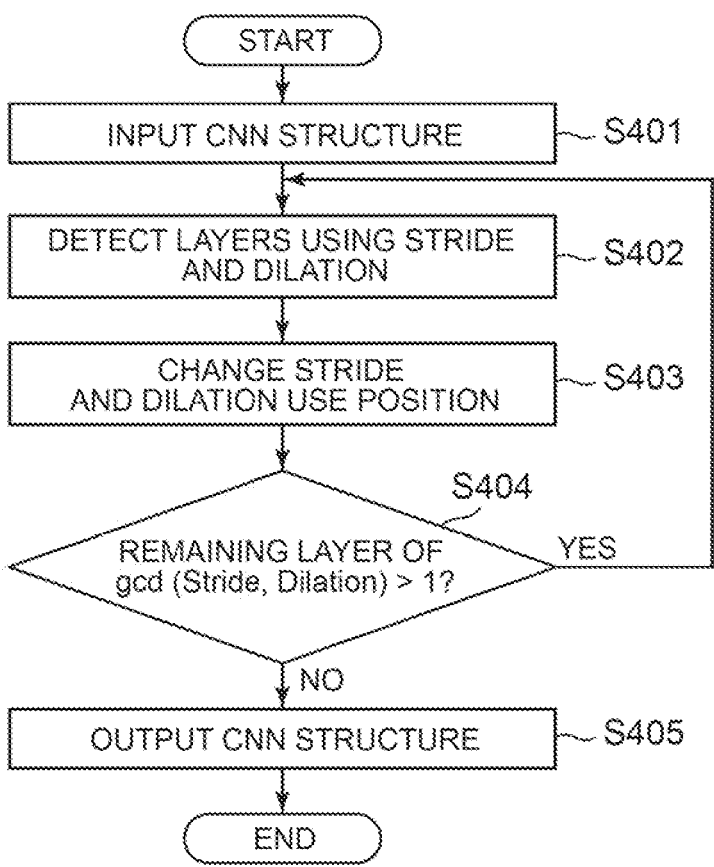
FIG. 6 It depicts a flowchart showing an example of an operation of a parameter optimization device of the first example embodiment.
FIG. 7 It depicts an explanatory diagram showing another example of an optimization method of parameter values in the first example embodiment.

In the example shown in FIG. 6, the CNN structure information 100 is input to the parameter optimization device 200 (step S401). The stride and dilation use layer detection unit 211 extracts layers in which parameters of stride and dilation are used from the input CNN structure information 100 (step S402).

Then, the stride and dilation use position modification unit 212 changes the stride value and the dilation value, based on information of the stride value and the dilation value extracted by the stride and dilation use layer detection unit 211, according to the logic described above (step S403).

When there are still layers for which the greatest common divisor of the two parameters g (gcd (Stride, Dilation)) is greater than 1, processes of step S402 and step S403 are executed again.

When the greatest common divisor g (gcd (Stride, Dilation)) of the two parameters in all layers reaches 1, at step S405, the parameter optimization device 200 outputs the modified CNN structure information 300.

To further generalize, not only when both the stride and the dilation are 2, but also when the greatest common divisor g (gcd (Stride, Dilation)) of the two parameters is greater than 1, the stride value and the dilation value can be changed as follows.

$$g=gcd(\text{Stride,Dilation})$$

$$S'(L)=S(L)/g$$

$$S'(L-1)=S(L-1)\times g$$

$$D'(L)=D(L)/g \tag{1}$$

where S (L) indicates the stride value of the layer L and D (L) indicates the dilation value of the layer L. S (L−1) indicates the stride value of the layer (L−1). S' indicates the stride value after the change and D' indicates the dilation value after the change.

For example, in the example shown in FIG. 7, the stride value is 2 and the dilation value is 4 in Layer 3 of the CNN. The stride and dilation use position modification unit 212 changes the stride value in Layer 2 from 1 to 2, changes the stride value in Layer 3 from 2 to 1, and changes the dilation value from 4 to 2, using g=gcd (2, 4)=2.

Figure 8:
FIG. 8 It depicts an explanatory diagram showing another example of an optimization method of parameter values in the first example embodiment.

In the example shown in FIG. 8, the stride value is 4 and the dilation value is 2. In other words, the stride value and the dilation value are reversed from the example shown in FIG. 7. The stride and dilation use position modification unit 212 changes the stride value in Layer 2 from 1 to 2, changes the stride value in Layer 3 from 4 to 2, and changes the dilation value from 2 to 1, using g=gcd(4, 2)=2.

Figure 9:
FIG. 9 It depicts an explanatory diagram showing another example of an optimization method of parameter values in the first example embodiment.

In the example shown in FIG. 9, the stride value and the dilation value are 4, respectively. The stride and dilation use position modification unit 212 changes the stride value in Layer 2 from 1 to 4, changes the stride value in Layer 3 from 4 to 1, and changes the dilation value from 1 to 1, using g=gcd(4, 4)=4.

Figure 10:
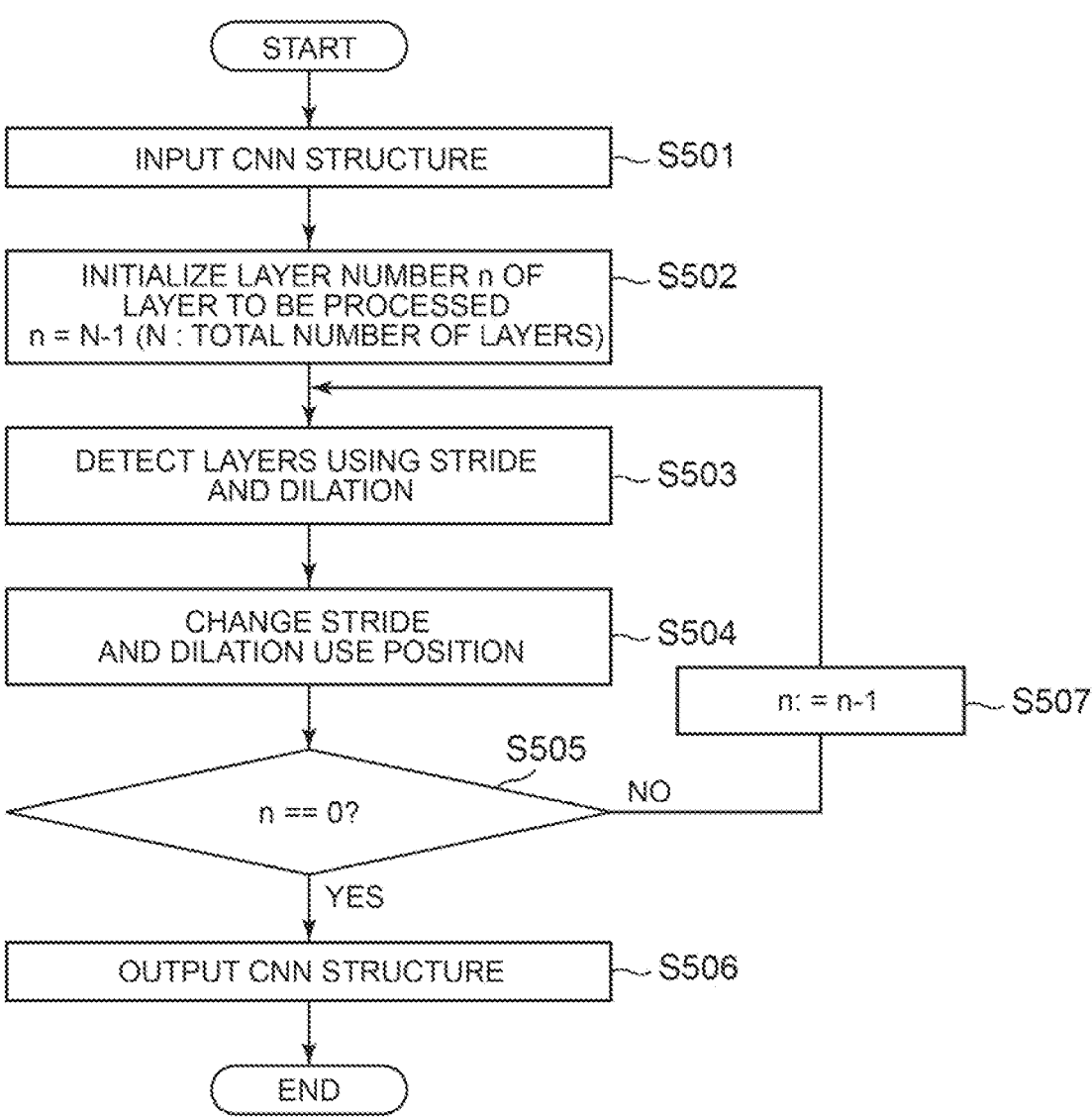
FIG. 10 It depicts a flowchart showing another example of an operation of a parameter optimization device of the first example embodiment.

Based on the above concept, the optimization in this example embodiment can be performed as shown in the flowchart shown in FIG. 10. In other words, optimization can be applied to all layers by applying the optimization process once to each layer in turn from the deepest layer to the shallowest layer.

In the example shown in FIG. 10, the CNN structure 100 is input to the parameter optimization device 200 (step S501). The parameter optimization device 200 initializes the layer number n of the layer to be processed (step S502). Specifically, when the total number of all layers is N, the layer number n is set to (N−1).

The processes of step S503 and step S504 are the same as the processes of step S402 and step S403 described above. However, the processes of step S502 and step S503 are executed on a single layer.

The processes of step S503 and step S504 are repeated in order from the deep layer to the shallow layer until processes for all layers have been processed (steps S505 and S507).

When the processes are completed for all layers, the parameter optimization device 200 outputs the modified CNN structure information 300 (step S506).

If the assumed maximum values of stride and dilation (the maximum value intended to be applied) are less than or equal to a predetermined value (e.g., 6), the above equation (1) means that both the stride value and the dilation value in a given layer are divided by 2 when each of the stride value and the dilation value is a multiple of 2. The equation (1) also means to multiply the stride value for the layer that is one-level shallower than the given layer by 2.

As explained above, the parameter optimization device 200 of this example embodiment can change the layer to which the stride process is applied to the layer one level before that layer, when both the stride value and the dilation value, that are the convolutional parameters are simultaneously greater than 1 in a certain layer of a convolutional neural network. Therefore, the parameter optimization device 200 of this example embodiment can reduce processing amount in the given layer and the layer one level before the given layer.

In addition, the effect of improving performance is obtained in device or execution apparatus that are not good at processing dilation that is larger than by also reducing the dilation by the parameter optimization device 200 of this example embodiment.

Example Embodiment 2

In the case where a shortcut structure used by ResNet and others exists in a CNN model, when a stride move is applied due to the optimization in the above example embodiment, it may be necessary to modify the processing of the shortcut structure to accommodate the move.

Figure 11:
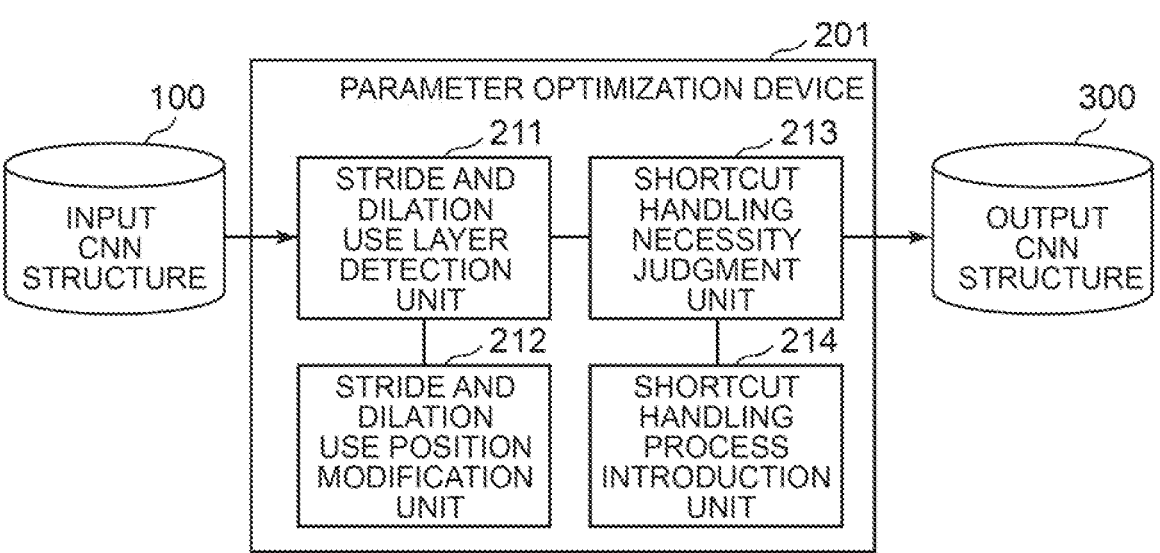
FIG. 11 It depicts a block diagram showing an example of a parameter optimization device of the second example embodiment.

Hereinafter, the second example embodiment of the present invention will be explained with reference to the drawings. FIG. 11 is a block diagram showing an example of a parameter optimization device 201 of the second example embodiment. The parameter optimization device 201 of the second example embodiment includes four processing blocks as shown in FIG. 11. That is, the parameter optimization device 201 includes a stride and dilation use layer detection unit 211, a stride and dilation use position modification unit 212, a shortcut addressing necessity determination unit 213, and a shortcut addressing process introduction unit 214. Note that the other components except for the shortcut addressing necessity determination unit 213 and the shortcut addressing process introduction unit 214 are the same as those in the configuration of the parameter optimization device 200 of the first example embodiment.

The shortcut addressing necessity determination unit 213 determines whether or not shortcut processing exists. The shortcut addressing necessity determination unit 213 determines whether or not the change by the stride and dilation use position modification unit 212 requires introduction of a new shortcut structure.

The shortcut addressing process introduction unit 214 adds a new shortcut structure that is required as a result of the change of the stride value and the dilation value to the CNN model.

Figure 12:
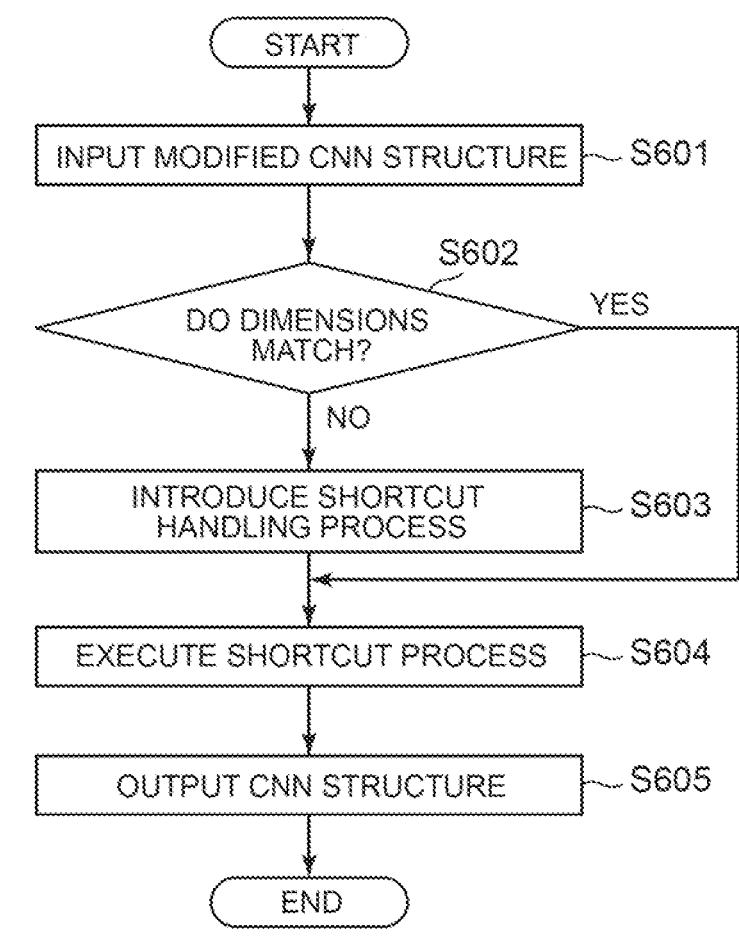
FIG. 12 It depicts a flowchart showing an operation of modifying a shortcut process performed by the parameter optimization device of the second example embodiment.

The parameter optimization device 201 performs the same processing as the parameter optimization device 200 of the first example embodiment, and then, executes the process shown in the flowchart in FIG. 12.

FIG. 12 is a flowchart showing an operation of modifying a shortcut process performed by the parameter optimization device 201 of the second example embodiment.

When the CNN structure after the parameter change (equivalent to the output CNN structure in the first example embodiment) is input to the parameter optimization device 201 (step S601), the shortcut addressing necessity determination unit 213 determines whether or not the change of parameters by the stride and dilation use position modification unit 212 requires introduction of a new shortcut structure. As an example, the shortcut addressing necessity determination unit 213 determines whether or not dimensionalities of the input of the pair and the output of the previous pair are the same, regarding three layers as a pair (Step S602). The dimensionality is each dimensionality of the width W, the height H, the number of channels C, etc.

In step S602, when dimensionalities are different, the shortcut addressing process introduction unit 214 adds a process corresponding to a new shortcut structure that is required as a result of the change of the stride value and the dilation value to the CNN model (step S603). Then, the parameter optimization device 201 performs the shortcut process including a shortcut addressing process (step S604). A specific introduction method is described below. On the other hand, when dimensionalities match, the parameter optimization device 201 performs the normal shortcut process.

After the shortcut process has been performed, the parameter optimization device 201 outputs the CNN structure information 300 (step S605).

Figure 13:
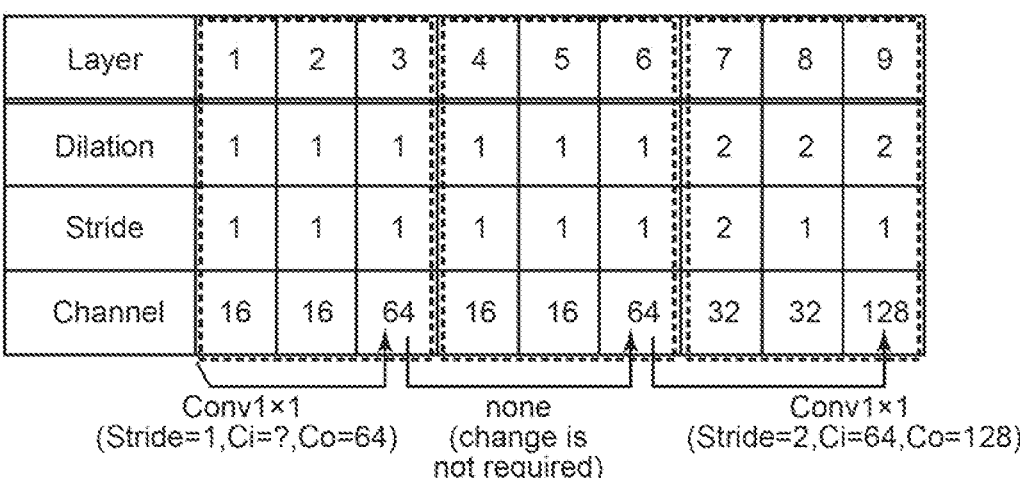
FIG. 13 It depicts an explanatory diagram for explaining a general shortcut process.
Figure 14:
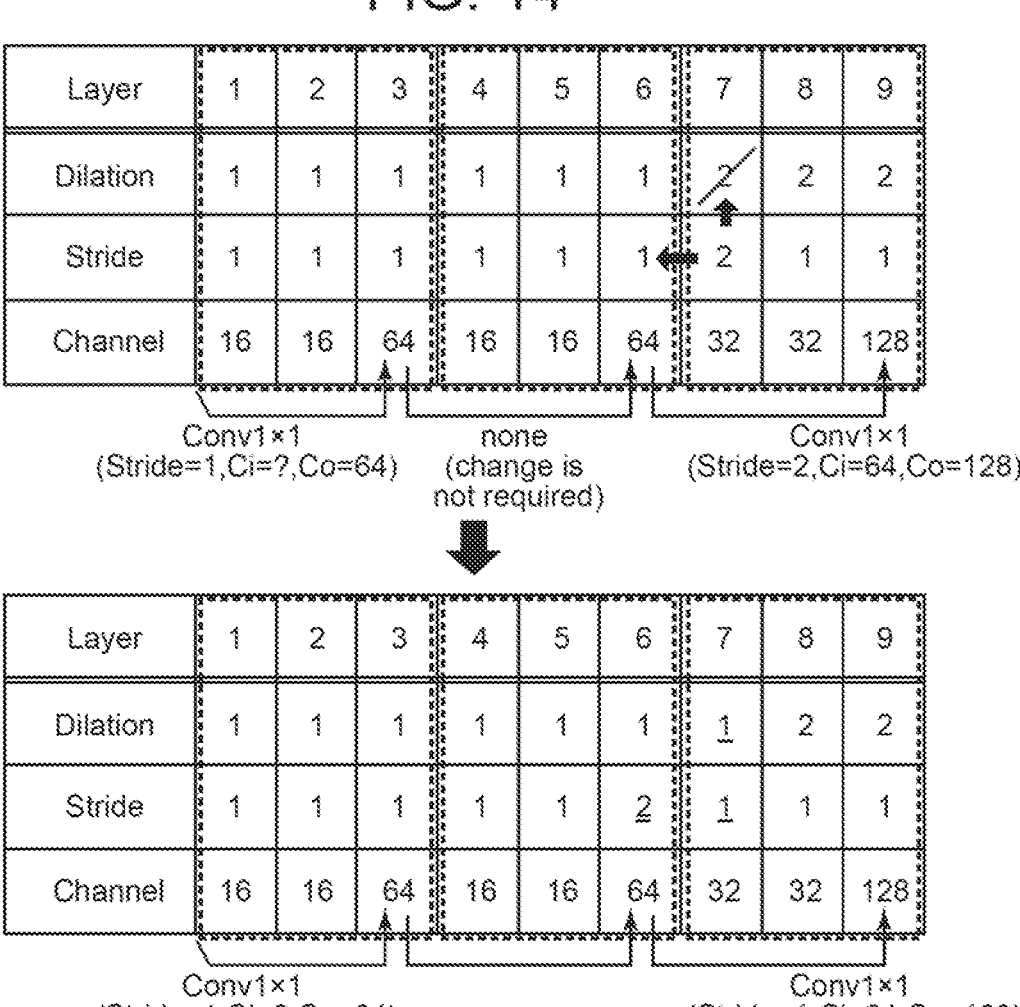
FIG. 14 It depicts an explanatory diagram for explaining a shortcut process including a shortcut addressing process.

FIG. 13 is an explanatory diagram for explaining a general shortcut process. FIG. 14 is an explanatory diagram for explaining a shortcut process including a shortcut addressing process.

In the network structure shown in FIG. 13, three layers are considered a set. Specifically, Layers 1, 2, and 3 are the first set, Layers 4, 5, and 6 are the second set, and Layers 7, 8, and 9 are the third set. The output result of the previous set are added to the output of the current set. This is called a shortcut.

In general, in a shortcut, when the dimensionality (each of W, H, C) of the input and the dimensionality of output are the same, the process of simply adding them together is performed. When the dimensionalities are different, a new convolution process is often introduced so as to eliminate the difference in dimensionalities. For example, a stride is used so as to eliminate differences in W and H, and a 1×1 convolution is used so as to eliminate difference in C.

In the example shown in FIG. 13, in Layers 1, 2, and 3 as the first set, the number of output channels is 64 and the number of input channels is unknown. When the input to Layer 1 is an image of 3 channels, a 1×1 convolution process with 3 input channels and 64 output channels is introduced to a shortcut.

Similarly, in Layers 7, 8, and 9 as the third set, the input size to the set and the output size are different (size ratio is 4:1) because a stride is used in Layer 7. The number of input channels is 64 and the number of output channels is 128, which are different. Therefore, a 1×1 convolution process with the stride value is 2, 64 input channels, and 128 output channels is introduced to a shortcut.

On the other hand, in Layers 4, 5, and 6 as the second set, the number of input channels matches the number of output channels at 64. In addition, W and H do not change because the stride values of Layers 4, 5, and 6 are all 1. Therefore, introducing a 1×1 convolution process, etc. to a shortcut is not required (None).

However, when focusing on Layer 7, the stride value and the dilation value are both 2, which can be optimized (refer to the upper row in FIG. 14). In other words, the stride and dilation use position modification unit 212 changes the stride value of Layer 6 to 2, the stride value of Layer 7 to 1, and the dilation value to 2 (refer to the lower row in FIG. 14).

When focusing on the second set of Layers 4, 5, and 6 after each parameter has been changed, the dimensionalities of W and H will be different in the input and the output. Therefore, it is necessary to introduce a process to match dimensionalities, such as the process in step S603 in the flowchart shown in FIG. 12.

Note that for Layers 4, 5, and 6, dimensionalities of W and H are different but dimensionalities of C are the same. Therefore, the process that should be introduced is a thinning process of pixels whose stride value corresponds to 2.

The shortcut addressing process may be implemented in any way as long as the modification of shortcut in response to the parameter change can be implemented. For example, when the framework for used deep learning supports only limited processing, as an example, if a layer is not defined (provided) to implement only pixel thinning, a 1×1 convolution process may be substituted. The values of the weights for the 1×1 convolution are expressed by a square matrix with a dimensionality (number of input channels×number of output channels). In this case, to avoid transforming input value, in the value of the square matrix, only diagonal components should be 1 and all others should be 0. In other words, the square matrix should be a unitary matrix. In the optimization in this example embodiment, the number of input channels and the number of output channels are not increased or decreased, respectively.

As described, when the shortcut process before the shortcut addressing process (the shortcut process before the modification) does not change the input value (the values of W, H) the shortcut addressing process introduction unit 214 introduces a thinning process with a stride whose value is equal to the stride value after the change by the stride and dilation use position modification unit 212, or a 1×1 convolution process such that the stride has the same value as the stride value after the change and the weights are represented by a unit matrix. When the shortcut process before the shortcut addressing process includes a 1×1 convolution process, the shortcut addressing process introduction unit 214 changes the stride value of the 1×1 convolution process to a value multiplied by the stride value after the change by the stride and dilation use position modification unit 212.

As explained above, when there is a shortcut structure used by ResNet and others in the input CNN model, the parameter optimization device 201 in this example embodiment introduces and executes a process addressing the shortcut structure. As a result, an amount of CNN processing can be reduced even when a shortcut structure exists.

Figures 15, 16A, 16B:
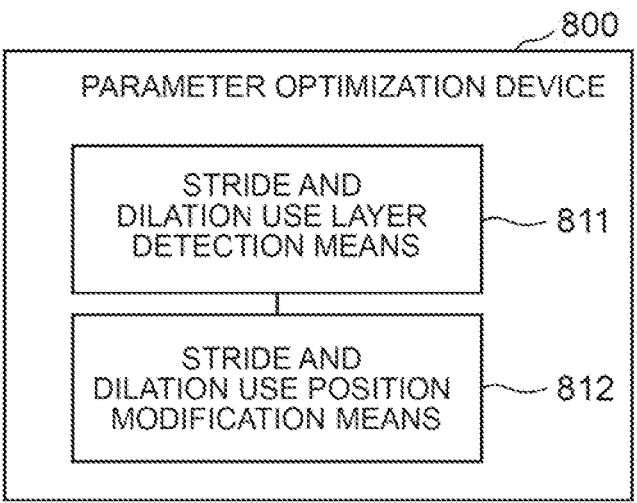
FIG. 15 It depicts a block diagram showing the main part of a parameter optimization device.
FIG. 16A It depicts an explanatory diagram for explaining a stride.
FIG. 16B It depicts an explanatory diagram for explaining a stride.
Figure 17:
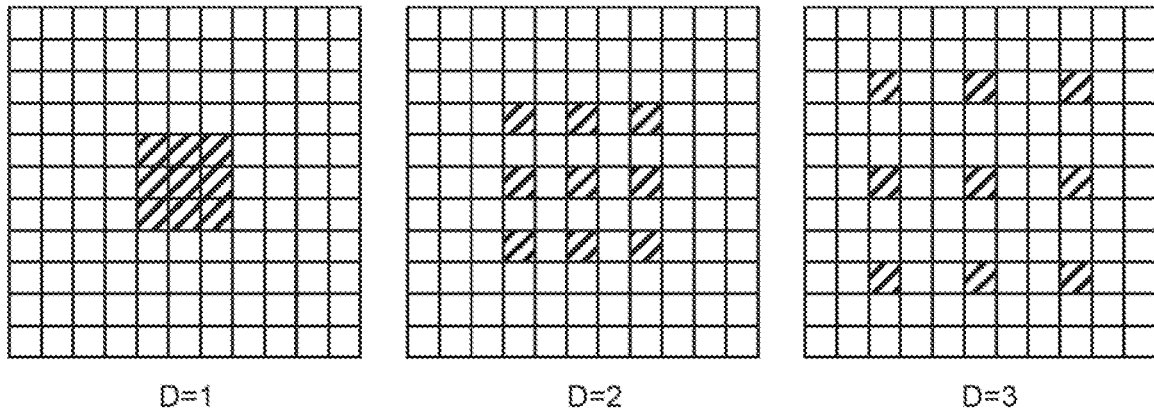
FIG. 17 It depicts an explanatory diagram for explaining a dilation.

FIG. 15 is a block diagram showing the main part of the parameter optimization device. The parameter optimization device 800 optimizes input CNN structure information and outputs optimized CNN structure information, and comprises stride and dilation use layer detection means 811 (in the example embodiments, realized by the stride and dilation use layer detection unit 211) for extracting stride and dilation parameter information for each convolution layer from the input CNN structure information, and stride and dilation use position modification means (in the example embodiments, realized by the stride and dilation use position modification unit 212) 812 for changing the stride and dilation parameter information of the convolution layer.

A part of or all of the above example embodiment may also be described as, but not limited to, the following supplementary notes.

(Supplementary note 1) A parameter optimization device that optimizes input CNN structure information and outputs optimized CNN structure information, comprising:

stride and dilation use layer detection means for extracting stride and dilation parameter information for each convolution layer from the input CNN structure information, and stride and dilation use position modification means for changing the stride and dilation parameter information of the convolution layer.

(Supplementary note 2) The parameter optimization device according to Supplementary note 1, wherein until there are no more pairs of changeable stride and dilation parameters for all convolution layers in the CNN structure, the stride and dilation use layer detection means repeatedly executes a process for extracting the parameter information, and the stride and dilation use position modification means repeatedly executes a process for changing the parameter information.

(Supplementary note 3) The parameter optimization device according to Supplementary note 1, wherein the stride and dilation use layer detection means executes a process for extracting the parameter information for each layer in the convolution layer in the CNN structure while switching the layer from a deep layer to a shallow layer, and the stride and dilation use position modification means executes a process for changing the parameter information for each layer in the convolution layer in the CNN structure while switching the layer from a deep layer to a shallow layer.

(Supplementary note 4) The parameter optimization device according to any one of Supplementary notes 1 to 3, wherein when the greatest common divisor of a stride value and a dilation value for a certain convolution layer is greater than 1, the stride and dilation use position modification means changes the stride value for the certain convolution layer to a value obtained by dividing the stride value by the greatest common divisor, the dilation value for the certain convolution layer to a value obtained by dividing the dilation value by the greatest common divisor, and a stride value for the convolution layer that is one-level shallower than the certain convolution layer to a value obtained by multiplying the stride value by the greatest common divisor.

(Supplementary note 5) The parameter optimization device according to any one of Supplementary notes 1 to 3, wherein when both a stride value and a dilation value for a certain layer are 2, the stride and dilation use position modification means changes the stride value for the certain convolution layer to a value obtained by dividing the stride value by 2, the dilation value for the certain convolution layer to a value obtained by dividing the dilation value by 2, and a stride value for the convolution layer that is one-level shallower than the certain layer to a value obtained by multiplying the stride value by 2.

(Supplementary note 6) The parameter optimization device according to any one of Supplementary notes 1 to 5, further comprising shortcut addressing necessity determination means for determining whether a modification of a shortcut process due to a result of changing the stride and dilation is required or not in the case where the CNN structure includes the shortcut process, and shortcut addressing process introduction means for modifying the shortcut process when the shortcut addressing necessity determination means determines that the modification of the shortcut process is required.

(Supplementary note 7) The parameter optimization device according to Supplementary note 6, wherein the shortcut addressing necessity determination means determines that the modification of the shortcut process is required, when the change of the stride by the stride and dilation use position modification means occurs in two convolution layers across an addition process in the shortcut process.

(Supplementary note 8) The parameter optimization device according to Supplementary note 6 or 7, wherein the shortcut addressing process introduction means introduces a thinning process with the stride whose value is equal to the stride value after the change by the stride and dilation use position modification means, or a 1×1 convolution process such that the stride has the same value as the stride value after the change and the weights are represented by a unit matrix, when the shortcut process before the modification does not change input value, and changes the stride of the 1×1 convolution process to a value multiplied by the stride value after the change by the stride and dilation use position modification means, when the shortcut process before the modification includes the 1×1 convolution process.

(Supplementary note 9) A parameter optimization method for optimizing input CNN structure information and outputting optimized CNN structure information, comprising:

extracting stride and dilation parameter information for each convolution layer from the input CNN structure information, and changing the stride and dilation parameter information of the convolution layer.

(Supplementary note 10) The parameter optimization method according to Supplementary note 9, further comprising determining whether a modification of a shortcut process due to a result of changing the stride and dilation is required or not in the case where the CNN structure includes the shortcut process, and when determining that the modification of the shortcut process is required, modifying the shortcut process.

(Supplementary note 11) A computer readable recording medium storing a parameter optimization program for optimizing input CNN structure information and outputting optimized CNN structure information, wherein the program causes a processor to execute:

a process of extracting stride and dilation parameter information for each convolution layer from the input CNN structure information, and a process of changing the stride and dilation parameter information of the convolution layer.

(Supplementary note 12) The recording medium according to Supplementary note 11, wherein the program causes a processor to further execute a process of determining whether a modification of a shortcut process due to a result of changing the stride and dilation is required or not in the case where the CNN structure includes the shortcut process, and a process of modifying the shortcut process when determining that the modification of the shortcut process is required.

(Supplementary note 13) A parameter optimization program for optimizing input CNN structure information and outputting optimized CNN structure information, causing a computer to execute:

a process of extracting stride and dilation parameter information for each convolution layer from the input CNN structure information, and a process of changing the stride and dilation parameter information of the convolution layer.

(Supplementary note 14) The parameter optimization program according to Supplementary note 13, causing the computer to further execute a process of determining whether a modification of a shortcut process due to a result of changing the stride and dilation is required or not in the case where the CNN structure includes the shortcut process, and a process of modifying the shortcut process when determining that the modification of the shortcut process is required.

Although the invention of the present application has been described above with reference to the example embodiment, the present invention is not limited to the above example embodiment. Various changes can be made to the configuration and details of the present invention that can be understood by those skilled in the art within the scope of the present invention.

REFERENCE SIGNS LIST

100 Input CNN Structure
200 Parameter optimization device
211 Stride and dilation use layer detection unit
212 Stride and dilation use position modification unit
213 Shortcut addressing necessity determination unit
214 Shortcut addressing process introduction unit
300 Output CNN structure
800 Parameter optimization device
811 Stride and dilation use layer detection means
812 Stride and dilation use position modification means
1000 CPU
1001 Storage device
1002 Memory

What is claimed is:

1. A parameter optimization device that optimizes input CNN structure information and outputs optimized CNN structure information, the parameter optimization device comprising:

a memory storing a software component; and one or more processors configured to execute the instructions to:

extract stride and dilation parameter information for each convolution layer from the input CNN structure information; and change the stride and dilation parameter information of the convolution layer, wherein, until there are no more pairs of changeable stride and dilation parameters for all convolution layers in the CNN structure, the one or more processors execute the instructions to repeatedly execute a process for extracting the parameter information, and a process for changing the parameter information.

2. The parameter optimization device according to claim 1, wherein:

the one or more processors execute the instructions to execute a process for extracting the parameter information for each layer in the convolution layer in the CNN structure while switching the layer from a deep layer to a shallow layer, and the one or more processors execute a process for changing the parameter information for each layer in the convolution layer in the CNN structure while switching the layer from a deep layer to a shallow layer.

3. The parameter optimization device according to claim 1, wherein when the greatest common divisor of a stride value and a dilation value for a certain convolution layer is greater than 1, the one or more processors execute the instructions to change the stride value for the certain convolution layer to a value obtained by dividing the stride value by the greatest common divisor, the dilation value for the certain convolution layer to a value obtained by dividing the dilation value by the greatest common divisor, and a stride value for the convolution layer that is one-level shallower than the certain convolution layer to a value obtained by multiplying the stride value by the greatest common divisor.

4. The parameter optimization device according to claim 1, wherein when both a stride value and a dilation value for a certain layer are 2, the one or more processors execute the instructions to change the stride value for the certain convolution layer to a value obtained by dividing the stride value by 2, the dilation value for the certain convolution layer to a value obtained by dividing the dilation value by 2, and a stride value for the convolution layer that is one-level shallower than the certain layer to a value obtained by multiplying the stride value by 2.

5. The parameter optimization device according to claim 1, the one or more processors further execute the instructions to:

determine whether a modification of a shortcut process due to a result of changing the stride and dilation is required or not in the case where the CNN structure includes the shortcut process; and modify the shortcut process when it is determined that the modification of the shortcut process is required.

6. The parameter optimization device according to claim 5, wherein the one or more processors further execute the instructions to determine that the modification of the shortcut process is required, when the change of the stride occurs in two convolution layers across an addition process in the shortcut process.

7. The parameter optimization device according to claim 5, wherein the one or more processors execute the instructions to:

introduce a thinning process with the stride whose value is equal to the stride value after the change, or a 1×1 convolution process such that the stride has the same value as the stride value after the change and the weights are represented by a unit matrix, when the shortcut process before the modification does not change input value; and change the stride of the 1×1 convolution process to a value multiplied by the stride value after the change, when the shortcut process before the modification includes the 1×1 convolution process.

8. A parameter optimization method, implemented by a processor, for optimizing input CNN structure information and outputting optimized CNN structure information, the parameter optimization method comprising:

extracting stride and dilation parameter information for each convolution layer from the input CNN structure information; and changing the stride and dilation parameter information of the convolution layer, wherein until there are no more pairs of changeable stride and dilation parameters for all convolution layers in the CNN structure, a process for extracting the parameter information and a process for changing the parameter information are executed.

9. The parameter optimization method according to claim 8, further comprising:

determining whether a modification of a shortcut process due to a result of changing the stride and dilation is required or not in the case where the CNN structure includes the shortcut process; and when determining that the modification of the shortcut process is required, modifying the shortcut process.

10. A non-transitory computer readable recording medium storing a parameter optimization program for optimizing input CNN structure information and outputting optimized CNN structure information, wherein the program causes a processor to execute:

a process of extracting stride and dilation parameter information for each convolution layer from the input CNN structure information; and a process of changing the stride and dilation parameter information of the convolution layer, wherein until there are no more pairs of changeable stride and dilation parameters for all convolution layers in the CNN structure, the program causes the processor to execute a process for extracting the parameter information and a process for changing the parameter information.

11. The recording medium according to claim 10, wherein the program causes the processor to further execute:

a process of determining whether a modification of a shortcut process due to a result of changing the stride and dilation is required or not in the case where the CNN structure includes the shortcut process; and a process of modifying the shortcut process when determining that the modification of the shortcut process is required.

* * * * *